United States Patent [19]

Edwards et al.

[11] Patent Number: 5,607,034
[45] Date of Patent: Mar. 4, 1997

[54] CAM BRAKE SHOE WITH FORMED EDGES

[75] Inventors: David J. Edwards, Shelby; Donn C. Knight, Troy; Jonathan L. Wemple, Rochester Hills, all of Mich.

[73] Assignee: Rockwell International Corporation, Pittsburgh, Pa.

[21] Appl. No.: 399,051

[22] Filed: Mar. 8, 1995

[51] Int. Cl.⁶ .................................................. F16D 69/00
[52] U.S. Cl. .................. 188/250 A; 188/250 B; 188/250 E
[58] Field of Search .................. 188/250 R, 250 A, 188/250 C, 250 D, 250 E, 250 B; 192/107 R, 107 T

[56] References Cited

U.S. PATENT DOCUMENTS

| | | | |
|---|---|---|---|
| 1,628,388 | 5/1927 | Cautley | 188/250 D |
| 1,636,003 | 7/1927 | Brie | 188/250 C |
| 1,647,661 | 11/1927 | Peterson | 188/250 C |
| 1,659,368 | 2/1928 | Long | 188/250 D |
| 1,818,090 | 8/1931 | Peterson | 188/250 D |
| 1,865,548 | 7/1932 | Whitworth | 188/250 C |
| 1,957,635 | 5/1934 | Evans | 188/250 C |
| 2,109,722 | 3/1938 | Fawick | 188/250 E |
| 2,426,116 | 8/1947 | Oetzel | 188/250 C |
| 2,928,510 | 3/1960 | Kay | 188/250 C |
| 3,235,037 | 2/1966 | Peras | 188/250 B |
| 3,275,105 | 9/1966 | Petit | 188/250 B |

FOREIGN PATENT DOCUMENTS

| | | | |
|---|---|---|---|
| 879050 | 2/1943 | France | 188/250 A |

*Primary Examiner*—Lee W. Young

[57] ABSTRACT

An improved brake shoe table includes the edges of the brake shoe table being bent radially inwardly relative to the remainder of the table by between 45 and 90 degrees. The bent edges increase the rigidity of the brake shoe and also reduce localized lining wear by bringing the lining into contact with a brake drum in a more uniform fashion. Moreover, the improved brake shoe design has unexpectedly decreased the operation noise associated with the use of a cam brake system.

18 Claims, 2 Drawing Sheets

CAM BRAKE SHOE WITH FORMED EDGES

BACKGROUND OF THE INVENTION

This Application, in general, relates to an improved cam brake shoe having formed edges that increase the rigidity of the shoe to increase brake lining life, and also reduce noise from operation of the brake.

Cam braking systems are known in the prior art. In general, a brake actuator moves a cam member which in turn moves brake shoes to engage linings with a wheel drum. In one widely used type of brake, the cam is a "S-cam" having the general shape of an S. The S-cam is rotated by the brake actuator, and forces brake shoes to pivot outwardly into contact with the inner peripheral surface of a drum.

In this type of prior art braking system, the brake shoes receive brake linings at an outer peripheral surface, or table. When the brake is actuated, the brake shoe engages the lining with the rapidly rotating drum. The table of the brake shoe is relatively thin, and in the past brake shoe may not have been brought into contact with the drum across the entire circumferential extent of the brake lining.

Moreover the prior art brake shoe is subject to vibration and noise. In particular, the prior art brakes have sometimes resulted in high frequency squealing noises, which are undesirable.

SUMMARY OF THE INVENTION

In a disclosed embodiment of this invention, the brake shoe includes a table supporting the linings that extends between lateral edges. The lateral edges of the table are bent or formed towards a center of rotation of the drum. In a preferred embodiment of this invention, these bent edges extend circumferentially beyond the circumferential location of the lining mount to the table. The bent edges increase the rigidity of the table, and thus ensure that the lining is brought into contact with the drum more uniformly across the entire circumferential extent of the lining. Moreover, the specific structure of the table provides the unexpected result of decreasing the vibration and noise associated with operation of the cam brakes.

In one embodiment of this invention, the brake table is formed from a blank having a nominal width of five inches including the edges. In this embodiment, each of the edges extend for 0.5 inch. That is, the width of each end is 10 percent of the overall width. Preferably the edges each comprise less than 30 percent of the overall width, and in a more preferred embodiment less than 20 percent. Preferably the width of the edges is at least 4 percent of the overall width.

Moreover, the bent edge is preferably longer than the thickness of the table. In the above embodiment, the bent edges were each 0.5 inch, with the brake table having a nominal thickness of 0.179 inch. The ratio of the bent edge length to the thickness of the brake table is preferably selected to be between 2 and 4. Most preferably the ratio is between 2 and 3, and the most preferred ratio is provided by the dimensions described above.

In a preferred embodiment of this invention, the bent edges do not extend at a 90° angle directly downwardly from the nominal planar surface of the table. Rather, an angle between 45° and 90° relative to the table is preferably used. More preferably, the angle is between 60° and 80°, and most preferably the angle is 78°. In a preferred embodiment the edge is curled gradually downwardly rather than at a single angle. The above discussed angle is measured at the end of the edge.

With a brake shoe having a table with the formed edges as described in this invention, the rigidity of the table is greatly increased. The linings are brought into contact with the brake drum in a more uniform fashion, increasing the life of the linings and eliminating localized wear spots. Moreover, the entire brake system operates much more quietly, and resists vibrational forces.

These and other features of the present invention can be best understood from the following specification and drawings, of which the following is a brief description.

DETAILED DESCRIPTION OF A PREFERRED EMBODIMENT

Figure 1:
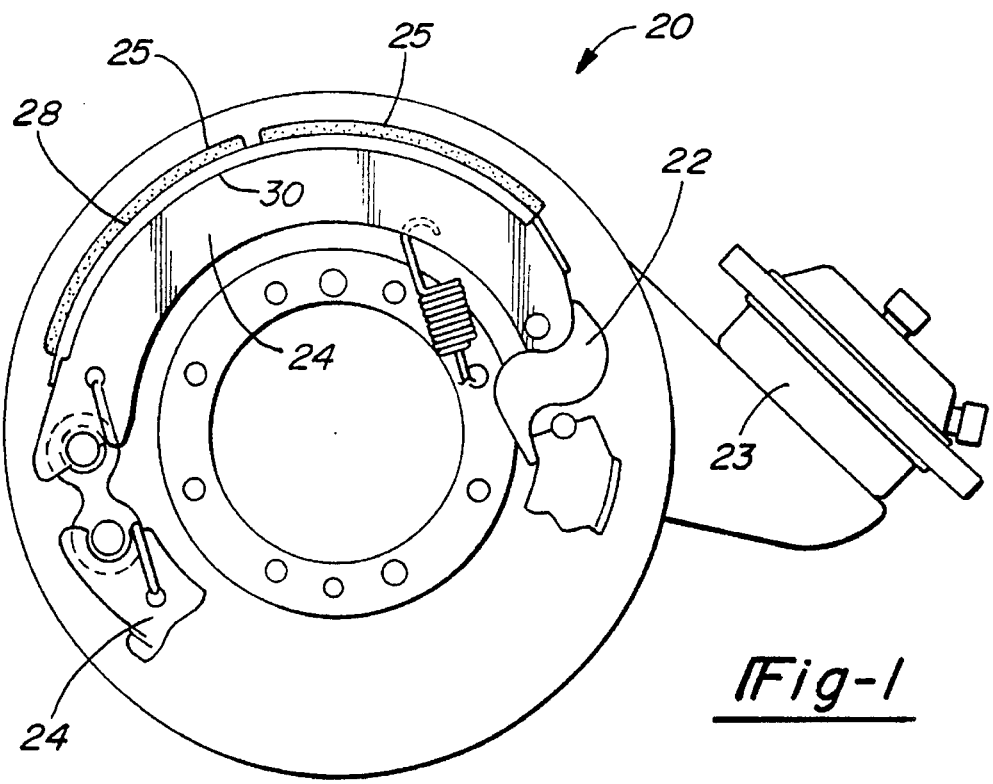
FIG. 1 is a view of an S-cam braking system incorporating the present invention.

As shown in FIG. 1, a cam braking system 20 incorporates an S-cam 22 which is rotated by a brake actuator 23. When the S-cam 22 rotates, it forces two brake shoes 24 to pivot radially outwardly and bring brake linings 25 into engagement with an inner peripheral surface of a drum. The brake linings then stop rotation of the drum and consequently an associated wheel. The linings are supported on a table 28 of the brake shoe 24. As shown, the brake shoe 24 incorporates lateral edges 30 extending downwardly from table 28.

Formed edges 30 extend circumferentially beyond the circumferential extent of the lining 25. Thus, the table 28 has sufficient rigidity in the location of the linings 25 to ensure that the linings are brought into contact with the drum in a uniform fashion. Further, and unexpectedly, the structure reduces the noise associated with operation of the cam brake 20.

Figure 2:
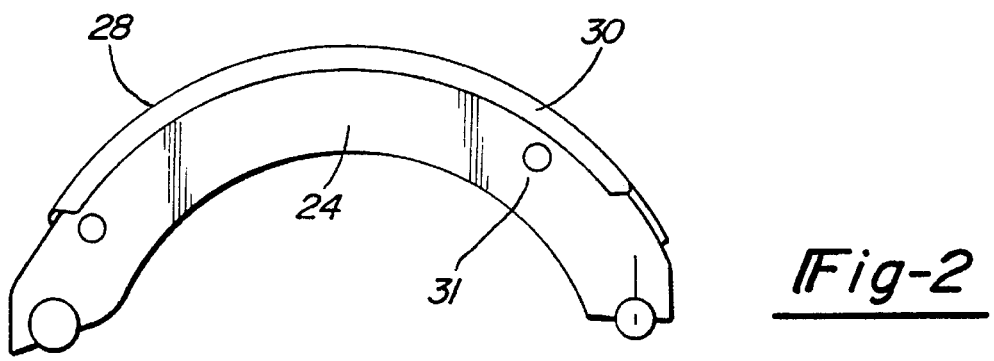
FIG. 2 is a side view of a brake shoe incorporating the present invention.

As shown in FIG. 2, the brake shoe 24 includes webs or legs 31 which extend radially inwardly, and which are connected to the table 28. The table 28 actually carries the linings 25. Edges 30 extend radially inwardly relative to the table 28.

Figure 3:
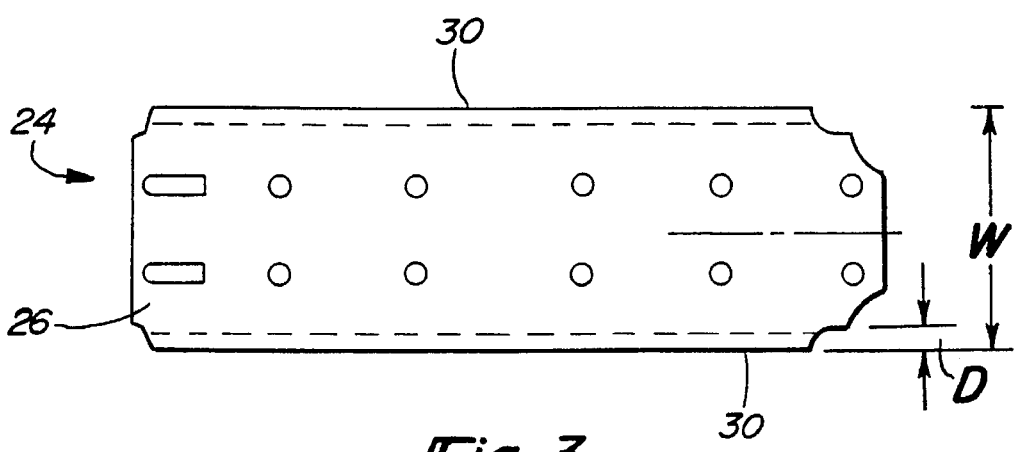
FIG. 3 is a plan view of the brake shoe incorporating the present invention.

FIG. 3 shows the brake shoe prior to the bending of edges 30. Table 28 extends laterally between the bent edges 30. The table 28 is formed having a width W extending from between the outer ends of edges 30. This width W, was 5.0 inches in one embodiment. In this embodiment the distance d of each bent edge is 0.5 inch. In a preferred embodiment of this invention, each edge extends for a distance d that is selected to be between 4 percent and 30 percent of the distance W. More preferably, the distance d is selected to be between 9 percent and 20 percent of W. In the specific embodiment discussed above, d was 10 percent of the entire distance W.

The 0.5 inch distance of the edge 30 is in a table member 28 having a nominal thickness of 0.179. With a preferred embodiment of this invention, the ratio of the bent edge distance to the thickness of the table is between 2 to 4. Most preferably, the preferred ratio of the length of the edge to the thickness of the table is between 2 and 3.

To form the shoe 24, the blank is bent to the proper curvature. The webs are then welded. The shoe is then placed in a coining die that forms edges 30 in the blank.

Figure 4:
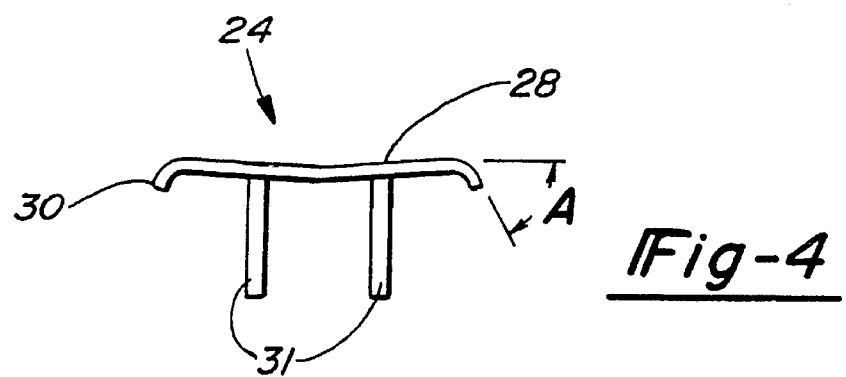
FIG. 4 is a cross-sectional view along the line 4—4 as shown in FIG. 2.

As shown in FIG. 4, the table 28 has some curvature throughout its extent. As also shown, the webs 31 extend radially outwardly to be connected to the table 28. The formed edges 30 extend downwardly from the nominal surface of the table at an angle A. As can be seen in FIG. 4, the edges 30 are rolled gradually rather than formed with a sharp bend. Moreover, it can also be seen in FIG. 4 that the brake table surface 28 is not a smooth planar surface. Even so, the angle A can be understood from FIG. 4, and a worker of ordinary skill in this art will be able to understand the disclosed angular ranges to achieve the benefits of this invention. Angle A is measured from the outermost end of edges 30, and is preferably between 45° and 90°. More preferably, angle A is selected to be between 70° and 80°. Even more preferably, angle A is 78°.

Figure 5:
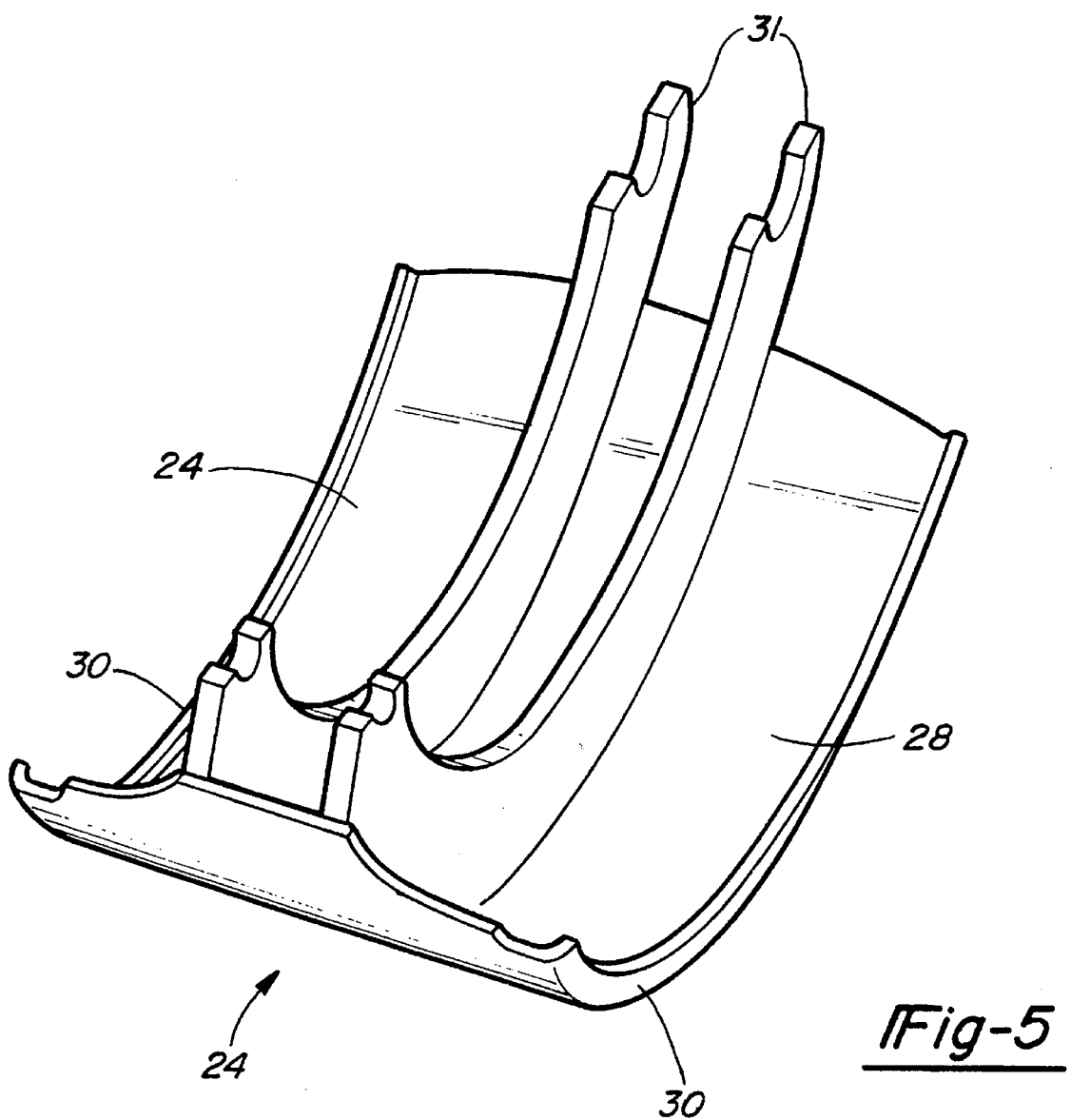
FIG. 5 is a perspective view of the invention.

FIG. 5 shows the underside of brake shoe 24. Edges 30 and legs 31 extend away from table 28.

A brake shoe constructed to incorporate the formed edges of this invention, has increased rigidity compared to prior art shoes. Thus, the brake linings are firmly supported as they are brought into contact with the brake drum. Moreover, the brake shoes are maintained in proper location such that the entirety of their circumferential extent is brought into contact with the brake drum. This eliminates or reduces local wear spots in the brake lining.

Unexpectedly, the formed edges have also reduced noises, and in particular high frequency noises resulting in quieter brake operation. In addition, the brake shoe is better applied to operate and withstand vibration compared to the prior art brake shoe.

While the invention is disclosed in an S-cam brake system, it should be understood that the invention will have benefits in any type of brake system which incorporates a brake shoe.

A preferred embodiment of this invention has been disclosed. However, a worker of ordinary skill in the art would recognize that certain modifications would come within the scope of this invention. For that reason the following claims should be studied to determine the true scope and content of this invention.

We claim:

1. A brake mechanism comprising:
   a brake shoe comprising two webs extending radially inwardly, and a brake table extending laterally and circumferentially to connect said two webs, said brake table extending along an axis of rotation of a wheel that is to be stopped for a distance described as a lateral distance, said brake table having lateral edges thereon wherein the outermost lateral edges of said brake table are bent relative to a central portion of said brake table at a bend angle measured relative to the central portion of the brake table from an innermost end of said edge adjacent said central portion to a laterally outermost end of said edge, said bend angle being less than 90 degrees and greater than 45 degrees;
   an actuation structure for actuating said brake shoe; and
   linings mounted on said brake table, said actuation structure moving said brake shoe to bring said linings into contact with the wheel to be stopped.

2. A brake mechanism as recited in claim 1, wherein both of said lateral edges are bent radially inwardly relative to said central portion of said brake table.

3. A brake mechanism as recited in claim 2, wherein said lateral edges on said brake table extend for a circumferential extent beyond the circumferential location of said linings.

4. A brake mechanism as recited in claim 2, wherein each bent edge has a lateral width and wherein the lateral width of each said bent edge is between 4 percent and 30 percent of an overall lateral width of said brake table.

5. A brake mechanism as recited in claim 4, wherein said lateral width of said edges is 4 percent to 20 percent of the overall lateral width.

6. A brake mechanism as recited in claim 2, wherein said table has a nominal thickness, and the ratio of the lateral width of said bent edges to said thickness is between 2 aand 4.

7. A brake mechanism as recited in claim 1, wherein said bend angle is 70°–80°.

8. A brake mechanism as recited in claim 1, wherein said edges are gradually formed into said band angle as a curve.

9. A brake shoe for use in a cam brake system comprising:
   a brake shoe body comprising at least one web extending radially inwardly;
   a brake table extending laterally and circumferentially radially outwardly of said at least one web, said table having two laterally outermost edges, said laterally outermost edges of said brake table being bent relative to a central point of said brake table at a bend angle measured relative to the central portion of the brake table from an innermost end of said edge adjacent said central portion of said table, and to a laterally outermost end of said edge, said bend angle being between 70 and 80 degrees.

10. A brake shoe as recited in claim 9, wherein said edges are bent radially inwardly and toward said at least one web from said table.

11. A brake shoe as recited in claim 10, said brake shoe having linings affixed thereto, wherein said lateral edges on said brake table extend for a circumferential extent beyond the circumferential location of said linings.

12. A brake shoe as recited in claim 10, wherein each said bent edge has a lateral width and wherein the lateral width of each said bent edges is between 4 percent and 30 percent of an overall lateral width of said brake.

13. A brake shoe as recited in claim 12, wherein said lateral width is 4 percent to 20 percent of the overall lateral width.

14. A brake shoe as recited in claim 10, wherein both of said lateral edges are bent radially inwardly relative to said central portion of said table.

15. A brake shoe as recited in claim 10, wherein said table has a nominal thickness, and the ratio of said lateral width of said bent edges to said thickness is between 2 and 4.

16. A brake shoe as recited in claim 9, wherein said edges are gradually formed into said bend angle as a curve.

17. A brake mechanism comprising:
   a brake shoe comprising two webs extending radially inwardly, and a brake table extending laterally and circumferentially to connect said two webs, said brake table extending along an axis of rotation of a wheel that is to be stopped for a distance described as a lateral distance, said brake table having lateral edges wherein the outermost lateral edges of said brake table are bent relative to a central portion of said brake table at a bend angle measured relative to the central portion of the brake table from an innermost end of said edge adjacent said central portion to a laterally outermost end of said edge, said bend angle being less than 90 degrees and greater than 45 degrees, the lateral width of each said bent edge being between 4 and 20 percent of the overall lateral width of said brake table, said table having a nominal thickness, and the ratio of the lateral width of said bent edges to said thickness being between 2 and 4;

an actuation structure for actuating said brake shoe; and linings mounted on said brake table, said actuator structure moving said brake shoe to bring said linings into contact with the wheel to be stopped, said lateral edges of said brake shoe extending for a circumferential extent beyond the circumferential location of said linings.

18. A brake mechanism as recited in claim 17, wherein said angle is 70–80 degrees.

* * * * *